(12) United States Patent
Sasaki et al.

(10) Patent No.: US 7,453,924 B2
(45) Date of Patent: Nov. 18, 2008

(54) DIVERSITY RECEIVER AND DIVERSITY RECEPTION METHOD

(75) Inventors: Makoto Sasaki, Yokohama (JP); Wataru Tomiya, Yokohama (JP); Ken Muramatsu, Yokohama (JP)

(73) Assignee: Panasonic Corporation, Osaka (JP)

( * ) Notice: Subject to any disclaimer, the term of this patent is extended or adjusted under 35 U.S.C. 154(b) by 722 days.

(21) Appl. No.: 10/758,170

(22) Filed: Jan. 15, 2004

(65) Prior Publication Data
US 2004/0170219 A1 Sep. 2, 2004

(30) Foreign Application Priority Data
Jan. 17, 2003 (JP) .......................... P. 2003-009874

(51) Int. Cl.
*H04B 1/707* (2006.01)
(52) U.S. Cl. ........................ 375/148; 375/347; 455/132; 455/500
(58) Field of Classification Search ................. 375/148, 375/267, 316, 347; 455/132, 296
See application file for complete search history.

(56) References Cited

U.S. PATENT DOCUMENTS

| 5,561,673 | A | * | 10/1996 | Takai et al. .................. 714/708 |
| 5,940,452 | A | * | 8/1999 | Rich ........................... 375/347 |
| 6,118,773 | A | * | 9/2000 | Todd ........................... 370/334 |
| 6,628,733 | B1 | * | 9/2003 | Tomiyoshi et al. .......... 375/347 |
| 2002/0119808 | A1 | * | 8/2002 | Seiki .......................... 455/575 |

FOREIGN PATENT DOCUMENTS

| JP | 3-242049 | 10/1991 |
| JP | 4-92839 | 8/1992 |
| JP | 5-252094 | 9/1993 |
| JP | 5-252100 | 9/1993 |
| JP | 2000-503184 | 3/2000 |
| JP | 2000-183792 | 6/2000 |
| JP | 2001-127675 | 5/2001 |
| JP | 2001-2512300 | 9/2001 |
| JP | 2002-185373 | 6/2002 |
| JP | 2002-204190 | 7/2002 |

* cited by examiner

*Primary Examiner*—David C Payne
*Assistant Examiner*—Leon Flores
(74) *Attorney, Agent, or Firm*—Pearne & Gordon LLP

(57) ABSTRACT

The present invention provides a diversity receiver and diversity reception method utilized for CDMA communication system. Antenna switching using antenna diversity is made possible with one decoding subsystem without losing the received data. A receive subsystem 6 receives an intermittent signal for standby operation by a first antenna 1 or a second antenna 2, the signal being sent out every slot cycle from each base station. Information about the received field strengths at the first and second antennas, 1 and 2, is acquired from the signal received by the receive subsystem 6. Base on this information, one of the first antenna 1 and second antenna 2 in a better reception environment when a transition is made from standby mode to a phone conversation is switched and connected to the receive subsystem 6. Then, the conversation is performed.

6 Claims, 2 Drawing Sheets

FIELD STRENGTH AT 1ST ANTENNA > FIELD STRENGTH AT 2ND ANTENNA

FIELD STRENGTH AT 1ST ANTENNA > FIELD STRENGTH AT 2ND ANTENNA

DIVERSITY RECEIVER AND DIVERSITY RECEPTION METHOD

BACKGROUND OF THE INVENTION

1. Field of the Invention

The present invention relates to a diversity receiver and diversity reception method performed in a communication device using a CDMA (code division multiple access) method.

2. Description of the Related Art

In a PDC-based mobile communication system, mobile stations and base stations employing antenna diversity are generally used. The PDC method adopts TDMA (time division multiple access) and so an antenna that is in an optimum reception environment is selected from plural antennas, based on the received field strength in each idle reception interval other than the present slot. Meanwhile, antenna diversity has been proposed also in CDMA techniques. (For example, in Reference 1: JP-A-2001-251230, Reference 2: JP-A-2001-127675, and Reference 3: JP-A-2000-503184.)

However, antenna diversity reception in CDMA is more difficult to achieve than PDC for the following reason. In CDMA, the received signal is code-divided. Therefore, the received field strength of the signal cannot be measured unless the received signal is decoded even to baseband. Therefore, the optimum reception environment cannot be judged. Furthermore, in CDMA, the received signal is discriminated from received signals from other users by code division. The received signal is not time-divided unlike in TDMA. Consequently, the received signal must be kept received and decoded. That is, if one tries to implement a method of TDMA for switching the used antenna during one reception and measuring the strengths at both antennas, the received data will be lost during switching of the antenna.

For the reasons described so far, it is necessary that circuits for encoding the received signal to baseband be equal in number with the antennas to realize antenna diversity in CDMA. Another problem is that the received data will be lost at the timing of antenna switching. These problems must be taken into account. Furthermore, in CDMA, it is only possible to receive signals from a single base station in standby mode, because the signals are code-divided differently for different base stations and the mobile station receives using a code for a sole corresponding base station.

In JP-A-2001-251230 (Reference 1), a receiver and method is proposed which is capable of selecting two antennas providing optimum receive characteristics out of plural antennas for CDMA mobile communication systems. To measure the received field strength in CDMA, it is necessary to decode the received signal even to baseband as mentioned previously. The problem is that a scheme that does not use plural decoding subsystems but compares the strengths by switching the antenna cannot be achieved. Where plural decoding subsystems are provided, there is the problem that the circuit scale is increased.

Furthermore, in JP-A-2001-127675 (Reference 2), a method of making the CDMA base station use antenna diversity is proposed. With this method, all the existing subsystems need to be modified, thus involving exorbitant cost. To avoid this, a method permitting the mobile station alone to cope with the situation is preferably adopted.

SUMMARY OF THE INVENTION

The present invention has been made in view of the foregoing problems and situations with the prior art. It is an object of the invention to provide a receiver and method for diversity reception used in a CDMA communication system, the receiver and method being characterized in that the used antenna can be switched with antenna diversity using only one decoding subsystem without losing received data. It is another object to provide a receiver and method for diversity reception characterized in that diversity can be accomplished by each mobile station alone without modifying the whole system including base stations.

The diversity receiver according to the present invention achieves above-described objects and is used in a CDMA communication system, the receiver having first and second antennas for receiving signals from a base station, a received field strength-measuring unit for measuring the received field strength produced at the first or second antenna by the intermittent signals sent out every designated slot cycle from the base station in standby mode, an information storage unit for storing information (hereinafter referred to as "field strength information") about the received field strengths of the intermittent signals received by the first and second antennas for the individual antennas, and an antenna selection unit for selecting the antenna at a higher received field strength based on the information about the reception environment of each antenna stored in the information storage unit immediately prior to start of a phone conversion when a transition is made from standby mode to the conversation.

Since the information storage unit stores the received field strengths of the individual antennas in this way, the used antenna can be switched with antenna diversity. Communications can be performed with an antenna placed in a better reception environment. Furthermore, only one decoding subsystem is necessary, because the information storage unit stores the received field strengths at the individual antennas. Antenna diversity can be accomplished without increasing the circuit scale or complicating the circuit.

Furthermore, in the diversity receiver according to the invention, the above-described antenna selection unit alternates the used antenna every said designated slot cycle in standby mode. The received field strength-measuring unit stores information about the received field strength at the antenna selected by the antenna selection unit in the information storage unit. In this way, the measurement of the received field strength is performed while switching the two antennas alternately every designated slot cycle. Consequently, the received data is not lost even in CDMA.

In addition, in the diversity receiver according to the invention, the antenna selection unit adjusts the ratios at which the antennas are respectively selected according to the received field strengths at the antennas in standby mode. The received field strength-measuring unit stores the field strength information about the antenna selected by the antenna selection unit in the information storage unit. In this way, the ratios at which the antennas are respectively selected are adjusted. Consequently, the receiver can wait in a better reception environment.

The diversity receiver according to the invention is fitted with a base station information acquiring unit for acquiring information about a base station (hereinafter referred to as "base station information") included in a signal received from the base station and for storing the information in the information storage unit. The first antenna receives the signal sent from a first base station. The base station information acquiring unit acquires base station information about the first base station and stores the information in the information storage unit. The second antenna receives the signal sent from a second base station. The base station information acquiring unit acquires base station information about the second base station and stores the information in the information storage unit. The antenna selection unit selects the antenna at a higher received field strength based on the information about the reception environments of the antennas stored in the information storage unit and on the base station information immediately prior to start of a phone conversation when a transition is made from standby mode to the conversation. Accordingly, diversity can be accomplished with a mobile station alone without modifying the whole system including base stations.

A method of diversity reception according to the present invention is performed by a diversity receiver used in a CDMA communication system, the receiver being fitted with first and second antennas for receiving signals from base stations. This method comprises the steps of: measuring the received field strength produced at the first or second antenna by an intermittent signal sent from a base station every designated slot cycle in standby mode; storing information (hereinafter referred to as "field strength information") about the received field strengths produced by the intermittent signal received by the first and second antennas for the individual antennas; and selecting the antenna at a higher received field strength based on the environment information about each antenna immediately before a phone conversation is started when a transition is made from standby mode to the conversation.

In the method of diversity reception according to the invention, in the aforementioned step of selecting the antenna, the antennas are alternately selected every said designated slot cycle.

Furthermore, in the method of diversity reception according to the invention, in the aforementioned step of selecting an antenna, the ratios at which the antennas are respectively selected are adjusted according to the received field strengths at the antennas in standby mode.

Moreover, the method of diversity reception according to the invention has the step of acquiring information (hereinafter referred to as "base station information") about a base station, the information included in a signal received from the base station. The step of acquiring base station information comprises a first acquiring base station information about a first base station included in a signal sent from the first base station and received by the first antenna and second acquiring base station information about a second base station included in a signal sent from a second base station and received by the second antenna. In the aforementioned step of selecting the antenna, the antenna is selected at a higher received field strength based on information about the reception environment of each antenna and on information about each base station immediately prior to start of a phone conversation when a transition is made from standby mode to the conversation.

Figure 1:
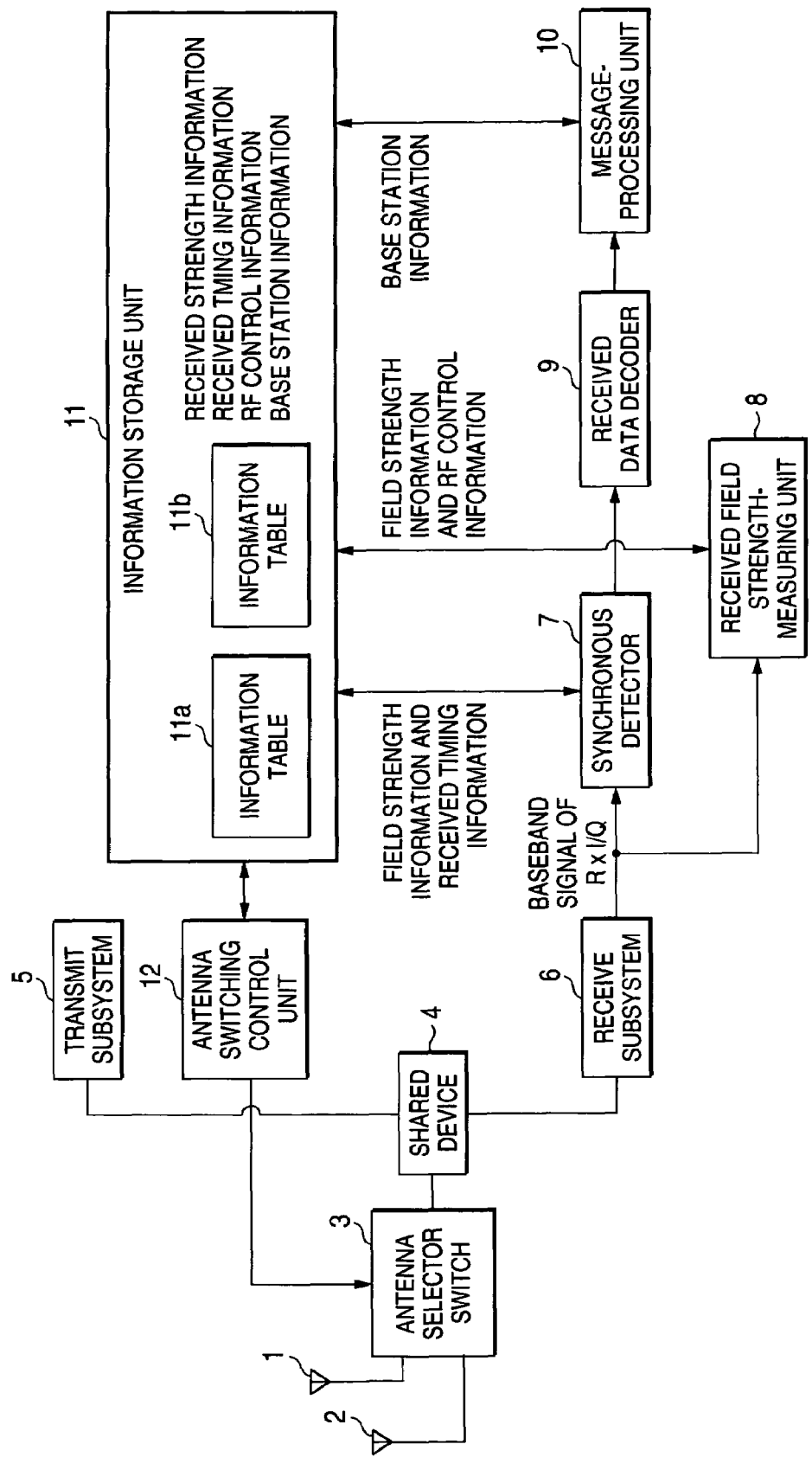
FIG. 1 is a block diagram showing a diversity receiver according to one embodiment of the present invention.

In the drawings, a reference numeral 1 refers to a first antenna; 2 to a second antenna; 3 to an antenna selector switch; 4 to a shared device; 5 to a transmit subsystem; 6 to a receive subsystem; 7 to a synchronous detector; 8 to a received field strength-measuring unit; 9 to a received data decoder; 10 to a message-processing unit; 11 to an information storage unit; and 12 to an antenna switching control unit.

DETAILED DESCRIPTION OF THE PREFERRED EMBODIMENTS

Receivers and methods for diversity reception in accordance with embodiments of the present invention are hereinafter described in detail with reference to the drawings. FIG. 1 is a block diagram showing a diversity receiver according to one embodiment of the invention. As shown in this figure, the diversity receiver according to the present embodiment is composed of a first antenna 1, a second antenna 2, an antenna selector switch 3 corresponding to the antenna selection unit referred to in the attached claims, a shared device 4, a transmit subsystem 5, a receive subsystem 6, a synchronous detector 7, a received field strength-measuring unit 8 corresponding to the received field strength-measuring unit referred to in the claims, a received data decoder 9, a message processing unit 10 corresponding to the base station information acquiring unit referred to in the claims, an information storage unit 11 corresponding to the information storage unit referred to in the claims, and an antenna switching control unit 12.

The components possessed by the diversity receiver according to the present embodiment are described below.

First, the antenna selection switch 3 makes a switch between the first antenna 1 and second antenna 2 to achieve antenna diversity. The shared device 4 discriminates the signal sent from the transmit subsystem 5 from a signal received by the first antenna 1 or second antenna 2. The transmit subsystem 5 modulates or otherwise processes a baseband signal of Rx I/Q. The receive subsystem 6 converts the received signal discriminated by the shared device 4 into a baseband signal of Rx I/Q.

The synchronous detector 7 synchronously detects the baseband signal converted by the receive subsystem 6. Furthermore, the synchronous detector 7 sends information about timing at which reception is made by the antennas 1 and 2 to the information storage unit 11. The received field strength-measuring unit 8 measures the received field strength (RSSI (received signal strength indicator) value) from the baseband signal. Information for RF control is created from this received field strength. The received field strength-measuring unit 8 sends the information about the received field strength and the information about the RF control to the information storage unit 11.

The received data decoder 9 decodes the baseband signal synchronously detected by the synchronous detector 7. The message-processing unit 10 decodes messages from the base stations (not shown). Furthermore, the message-processing unit 10 sends information about a base station (hereinafter referred to as "base station information") to the information storage unit 11, the base station information being included in a message received from the base station.

In addition, the information storage unit 11 stores the field strength information, reception timing information, RF control information, and base station information sent from the synchronous detector 7, received field strength-measuring unit 8, and message-processing unit 10 in information tables 11a and 11b provided for the antennas, respectively. The antenna switching control unit 12 controls operation of the antenna selector switch 3 to select the used antenna based on the field strength information obtained from the information storage unit 11.

The operation of the diversity receiver (i.e., method of diversity reception) according to the present embodiment is next described.

First, the operation in standby mode (intermittent reception) is described. In CDMA standby mode (intermittent reception), an intermittent signal sent from a base station at regular intervals (slot cycles) is received by a mobile station. Therefore, the mobile station performs its receive operation every slot cycle. After receiving the intermittent signal from the base station, the station sleeps up to the next receive operation. These receive operation and sleep operation are repeated every slot cycle.

Figure 2:
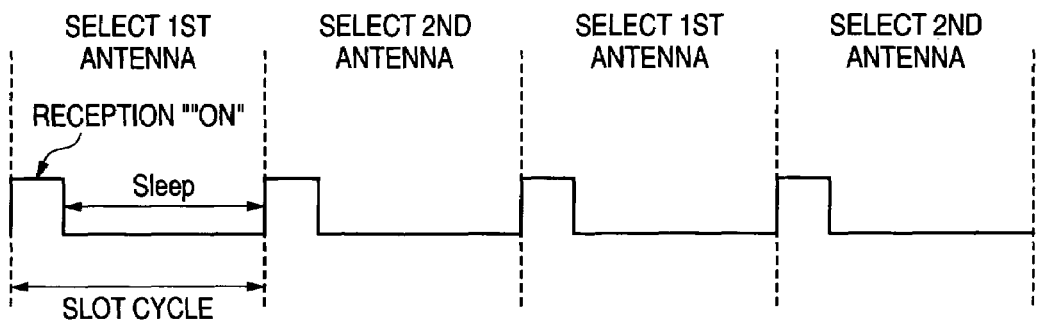
FIG. 2 is a diagram illustrating a first pattern of intermittent reception.

FIG. 2 is a diagram illustrating a first pattern of intermittent reception. In the illustrated first pattern, the antennas 1 and 2 are switched alternately. That is, in the first slot cycle, when the receiver is in the receive mode, the antenna selector switch 3 receives a switching control signal from the antenna switching control unit 12 and selects the first antenna 1. Then, the information storage unit 11 sends reception timing information, field strength information, RF control information, and base station information and returns these kinds of information back to the synchronous detector 7, received field strength-measuring unit 8, and message-processing unit 10, all of these kinds of information corresponding to the first antenna 1. A setup is made such that reception is started from a state corresponding to the first antenna 1. After receiving the intermittent signal from the base station, the receiver goes to sleep.

In the next slot cycle, when the receiver is in the receive mode, the antenna selector switch 3 receives a switching control signal from the antenna switching control unit 12 and selects the second antenna 2. Then, the information storage unit 11 sends receive timing information, field strength information, RF control information, and base station information and returns these kinds of information to the synchronous detector 7, received field strength-measuring unit 8, and message-processing unit 10, these kinds of information corresponding to the second antenna 2. A setup is made such that reception can be started from a state corresponding to the second antenna 2. After receiving the intermittent signal sent from the base station, the receiver goes to sleep. The antennas 1 and 2 are switched alternately every slot cycle in this way. The used antenna can be switched without losing the received data. Furthermore, it is only necessary to have only one decoding subsystem. In consequence, antenna diversity can be accomplished without increasing the circuit scale of the diversity receiver or complicating the circuit.

Figure 3:
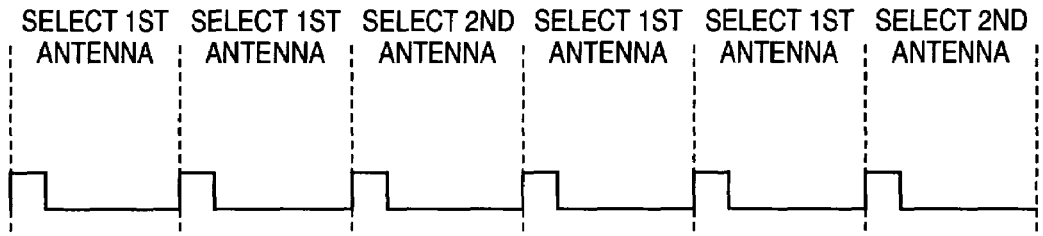
FIG. 3 is a diagram illustrating a second pattern of intermittent reception.

FIG. 3 is a diagram illustrating a second pattern of intermittent reception. In the illustrated second pattern, the ratios at which the antennas 1 and 2 are selected are adjusted according to the received field strengths, respectively, at the antennas 1 and 2. That is, the antenna switching is adjusted such that the antenna at a higher received field strength is selected more frequently. For example, where the received field strength at the first antenna 1 is higher than the strength at the second antenna 2, the antenna switching is done in 2:1 ratio, i.e., reception using the first antenna 1 is performed twice and reception using the second antenna 2 is performed once. Latitude may be provided in using the second pattern. For instance, the ratios may be varied according to the difference in the received field strength. By adjusting the ratios at which the antennas are respectively selected in this way, the standby operation can be performed in a better reception environment during the standby mode (intermittent reception).

Figure 4:
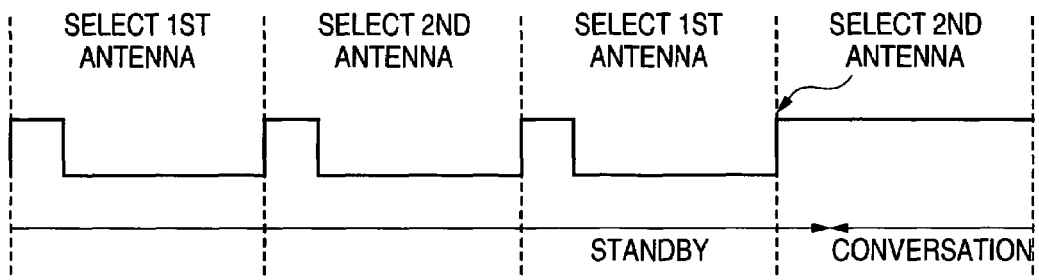
FIG. 4 is a diagram illustrating a transition from standby mode (intermittent reception) to a phone conversation.

A transition from standby mode (intermittent reception) to a phone conversation is next described by referring to FIG. 4, which illustrates the transition from standby mode (intermittent reception) to the phone conversation. In the illustrated embodiment, the received field strength at the first antenna 1 is higher than the strength at the second antenna 2, and the phone conversation is started when the second antenna 2 is selected in the standby mode. In this embodiment, during standby mode immediately prior to start of a phone conversation, the antenna (second antenna 2) at a weaker received field strength is selected. Therefore, to perform a phone conversation in a better reception environment, the used antenna is switched from the second antenna 2 to the first antenna 1. This switching is done during a transition from standby mode to phone conversation. Therefore, the antenna in a better environment, i.e., the antenna at a higher received field strength, is selected based on information about the reception environment immediately prior to start of a phone conversation. Then, a transition is made from the standby mode to the conversation. Consequently, it is possible to shift to the conversation without losing the received data.

Where a phone conversation is started while the second antenna 2 is selected as mentioned previously, the receiver may wait one slot cycle and switch to a phone conversation during the next selection of the first antenna 1 (when reception is being performed by the antenna at a higher received field strength) without making a switch from the second antenna 2 to the first antenna 1 during a transition from standby mode to phone conversation.

A method of diversity reception in which signals are received from two base stations in standby mode is next described. In CDMA, if a mobile station in standby mode registers its location with a base station, a call is made to a mobile station within the zone where plural base stations including the base station with which the registration has been made perform services. That is, as long as within the zone, the mobile station can hold the standby mode without the need to register its location. Using this scheme, a method of diversity in which signals are received from two base stations is accomplished.

During reception with the first antenna 1, various kinds of information about a base station a obtained from the message-processing unit 10 are saved in the information table 11a. During reception with the second antenna 2, various kinds of information about a base station b are saved in the information table 11b. At this time, if the zones of the base stations a and b overlap, both base stations a and b can make a call to the mobile station. Meanwhile, the mobile station switches the base station by switching the antennas 1 and 2 alternately every slot cycle and so the mobile station can receive calls from both base stations a and b.

Where different base stations are used, different signal paths for transmission and reception and different RF wave environments are used. Therefore, highly effective diversity can be accomplished. Accordingly, diversity can be realized with a mobile station alone without modifying the whole system including base stations. Furthermore, the connectivity to each base station can be improved greatly. In a case where the antennas 1 and 2 use different zones of receiving base stations, however, only one base station exchanges calls. Consequently, it is impossible to switch the used antenna to the antenna at a higher received field strength even when a transition is made from standby mode to phone conversation.

As described so far, the inventive receiver and method for diversity reception can accomplish antenna switching exploiting antenna diversity because the information storage unit stores the received field strengths at the individual antennas. Communication can be performed with the antenna located within a better reception environment. Furthermore, only one decoding subsystem needs to be fitted because the information storage unit stores the received field strengths at the individual antennas. Hence, antenna diversity can be accomplished without increasing the circuit scale or complicating the circuit.

What is claimed is:

1. A diversity receiver used in a CDMA communication system comprising: a first antenna for receiving signals from a first base station of a plurality of base stations, the plurality of base stations also including a second base station which is different from the first base station; a second antenna for receiving signals from the second base stations station, wherein the signals received by the first and second antennas are both intermittent CDMA signals; a received field strength measuring unit for measuring a first received field strength indicating a field strength of the intermittent CDMA signal received at said first antenna and a second received field strength indicating a field strength of the intermittent CDMA signal received at said second antenna, wherein said intermittent CDMA signals are sent from any one of the base stations every designated slot cycle in standby mode; an information storage unit for storing the first received field strength and the second received field strength; a base station information acquiring unit for acquiring first base station information included in the intermittent CDMA signal received by the first antenna and second base station information included in the intermittent CDMA signal received by the second antenna and storing the first base station information and the second base station information in said information storage unit; and an antenna selection unit for selecting one of said first antenna and second antenna at a higher received field strength based on the first received field strength of the intermittent CDMA signal including the first base station information and the second received field strength of the intermittent CDMA signal including the second base station information which are stored in said information storage unit prior to start of a phone conversation when a transition is made from standby mode to the phone conversation, wherein said first base station information is included in the signal which is sent from the first base station and received at said first antenna, and wherein said second base station information is included in the signal which is sent from the second base station and received at said second antenna.

2. The diversity receiver according to claim 1,
wherein said antenna selection unit selects one of the first and second antennas alternately every said designated slot cycle in standby mode, and
wherein said received field strength-measuring unit further stores field strength information regarding the field strength at the antenna selected by said antenna selection unit.

3. The diversity receiver according to claim 1,
wherein, in standby mode, said antenna selection unit adjusts ratios at which the antennas are selected according to the field strengths received at the antennas respectively, and
wherein said received field strength-measuring unit further stores field strength information regarding the field strength at the antenna selected by said antenna selection unit in said information storage unit.

4. A diversity reception method implemented by a diversity receiver used in a CDMA communication system, the receiver including first and second antennas for receiving signals from base stations including a first base station and a second base station, said method comprising the steps of: receiving, at the first antenna during standby mode, a first intermittent CDMA signal including first base station information from the first base station; receiving, at the second antenna during standby mode, a second intermittent CDMA signal including second base station information from the second base station; measuring a first received field strength indicating a field strength of the first intermittent CDMA signal received at the first antenna and a second received field strength indicating a field strength of the second intermittent CDMA signal received at a second antenna, wherein said intermittent signals are sent from the first and second base stations every designated slot cycle in standby mode; storing the first received field strength and the second received field strength; acquiring the first base station information and the second base station information, and storing the first base station information and the second base station information, wherein the first base station information is included in the signal which is sent from the first base station and is received at said first antenna, and wherein the second base station information is included in the signal which is sent from the second base station and is received at said second antenna; and selecting one of said first antenna and said second antenna at a higher received field strength based on the first received field strength of the signal including the first base station information and the second received field strength of the signal including the second base station information which are stored immediately prior to start of a phone conversation when a transition is made from standby mode to the conversation.

5. The diversity reception method according to claim 4,
wherein, in said step of selecting one of the antennas, the first and second antennas are selected alternately every said designated slot cycle in standby mode.

6. The diversity reception method according to claim 4,
wherein, in said step of selecting one of the antennas, ratios at which the first and second antennas are respectively selected are adjusted according to the received field strengths at the individual antennas.

* * * * *

UNITED STATES PATENT AND TRADEMARK OFFICE
CERTIFICATE OF CORRECTION

PATENT NO. : 7,453,924 B2  Page 1 of 1
APPLICATION NO. : 10/758170
DATED : November 18, 2008
INVENTOR(S) : Makoto Sasaki et al.

It is certified that error appears in the above-identified patent and that said Letters Patent is hereby corrected as shown below:

In column 7, line 15, please delete the word "stations". The line should read
-- receiving signals from the second base station, --

In column 8, line 41, please delete the word "immediately". The line should read
-- are stored prior to start of a phone conversation --

Signed and Sealed this

Eighth Day of June, 2010

David J. Kappos
*Director of the United States Patent and Trademark Office*